(12) United States Patent
Madril, Jr. et al.

(10) Patent No.: US 7,904,600 B2
(45) Date of Patent: Mar. 8, 2011

(54) INTEGRATING USER SPECIFIC OUTPUT OPTIONS INTO USER INTERFACE DATA

(75) Inventors: Robert John Madril, Jr., Boise, ID (US); Roger Scott Twede, Meridian, ID (US); Shell S. Simpson, Boise, ID (US)

(73) Assignee: Hewlott-Packard Development Company, L.P., Houston, TX (US)

( * ) Notice: Subject to any disclaimer, the term of this patent is extended or adjusted under 35 U.S.C. 154(b) by 2109 days.

(21) Appl. No.: 10/283,240

(22) Filed: Oct. 30, 2002

(65) Prior Publication Data

US 2004/0088438 A1    May 6, 2004

(51) Int. Cl.
*G06F 15/16*    (2006.01)
*G06F 15/173*   (2006.01)
*G06F 7/00*     (2006.01)
*G06F 3/00*     (2006.01)

(52) U.S. Cl. .......... 709/250; 709/225; 715/513; 715/741
(58) Field of Classification Search .......... 709/250, 709/225; 715/513, 741
See application file for complete search history.

(56) References Cited

U.S. PATENT DOCUMENTS

| | | | | |
|---|---|---|---|---|
| 6,115,040 A * | 9/2000 | Bladow et al. | | 715/741 |
| 6,623,527 B1 * | 9/2003 | Hamzy | | 715/513 |
| 2003/0065777 A1 * | 4/2003 | Mattila et al. | | 709/225 |
| 2005/0192809 A1 * | 9/2005 | Dodrill et al. | | 704/270.1 |

* cited by examiner

*Primary Examiner* — Philip C Lee (57) ABSTRACT

A method, program product and system for integrating user specific output options into an upload for a network service, the method comprising: obtaining information regarding user specific output options from an source that is not a part of the network service; and, incorporating the user specific output options into user interface data to be uploaded from a network service to a network service agent of the user. Another embodiment provides an implementation at the client side.

11 Claims, 4 Drawing Sheets

INTEGRATING USER SPECIFIC OUTPUT OPTIONS INTO USER INTERFACE DATA

BACKGROUND OF THE INVENTION

Most applications provide a few standard output options such as Save and Print. Many user's have come to accept this limited set of output options as normal. Also, the current application model forces application programs to depend on the operating system for output primitives and forces a given application to provide support into these primitives. Note that a "primitive" is a basic interface or segment of code that can be used to build more sophisticated program elements or interfaces. In the prior art, selected applications allow their toolbar to be customized for a user specific experience. This toolbar customization is limiting in the following ways: 1) User's must either install additional software or choose from a limited set of options offered by the application, and 2) User's must customize each application that they use.

Some websites are designed to allow the website to be customized on a user-by-user basis. However, this customization is accomplished by choosing from a palette of options and this palette of options does not generally have anything to do with printing and imaging.

Also in the prior art are websites that allow a user to maintain a collection of URLs (i.e., bookmarks) that the user can access at a later time to find sites of interest to the user. These websites are focused on offering a customized portal which enables the user (and possibly his friends) to find URLs of interest. It is important to note that the URLs provided by these systems are stored within the system by either the user or other delegates. It is also worth noting that these URLs are general purpose—they are not intended for use in printing and imaging operations (i.e., "sharing" operations). Accordingly, a problem exists in the provision of output options to a user across a variety of applications.

SUMMARY OF THE INVENTION

The present invention comprises in one embodiment, a method for integrating user specific output options into an upload for a network service, comprising: obtaining user specific output option URLs from a source that is not a part of the network service and incorporating the user specific output options, after they are obtained, into user interface data to be uploaded from the network service to a network service agent of the user.

The present invention comprises in a further embodiment, a method for integrating user specific output options into a web application download from a server onto a user's network service agent, comprising: obtaining user specific output options from a source that is not part of the network service; and incorporating the user specific output options into user interface data in web content residing at a user's network service agent.

The present invention comprises in a further embodiment, a program product for integrating user specific output options into an upload for a network service, comprising machine readable program code for causing a machine to perform the following method steps: obtaining information regarding user specific output option URLs from a source that is not a part of the network service; and, incorporating the user specific output options into user interface data to be uploaded from the network service to a network service agent of the user.

The present invention comprises in a further embodiment, a system for integrating user specific output options into an upload for a network service, comprising: a component for obtaining information regarding user specific output option URL's from a source that is not a part of the network service; and, a component for incorporating the user specific output options into user interface data to be uploaded from the network service to a network service agent of the user.

The present invention comprises in a further embodiment, a program product for integrating user specific output options into a web application download from a network service onto a user's network service agent, comprising machine readable program code for causing a machine to perform the following method steps: obtaining information regarding user specific output options from an source that is not part of the network service; and incorporating the user specific output options into user interface data in web content residing at a user's network service agent.

The present invention comprises in a further embodiment, a system for integrating user specific output options into a web application download from a network service onto a user's network service agent, comprising: a component for obtaining information regarding user specific output options from an source that is not part of the network service; and a component for incorporating the user specific output options into user interface data in web content residing at a user's network service agent.

The present invention comprises in a further embodiment a web based identity service that stores web references to user specified output options, which references may be retrieved by a web application or a browser.

The present invention comprises in a further embodiment a method for determining an active document, comprising: accessing an active document identity service; retrieving a reference to a document being operated on by an application; and passing the reference to a web output service.

DETAILED DESCRIPTION OF THE EMBODIMENTS OF THE INVENTION

The invention is described below with reference to drawings. These drawings illustrate certain details of specific embodiments that implement the systems and methods of the present invention. However, describing the invention with drawings should not be construed as imposing, on the invention, any limitations that may be present in the drawings. The present invention contemplates methods, systems and program products on any computer readable media for accomplishing its operations. The embodiments of the present invention may comprise a special purpose or general purpose computer including various computer hardware, the execution unit portion of which may also be known herein as a "processor."

Embodiments within the scope of the present invention also include computer-readable media and carriers for carrying or having computer-executable instructions or data structures stored thereon. Such computer-readable media can be any available media which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the portions of the invention includes a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Program code comprising one or more program modules may be stored on the hard disk, magnetic disk, optical disk, ROM or RAM, including an operating system, one or more application or software programs, other program modules, and program data.

The computer may operate in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet.

Figure 1:
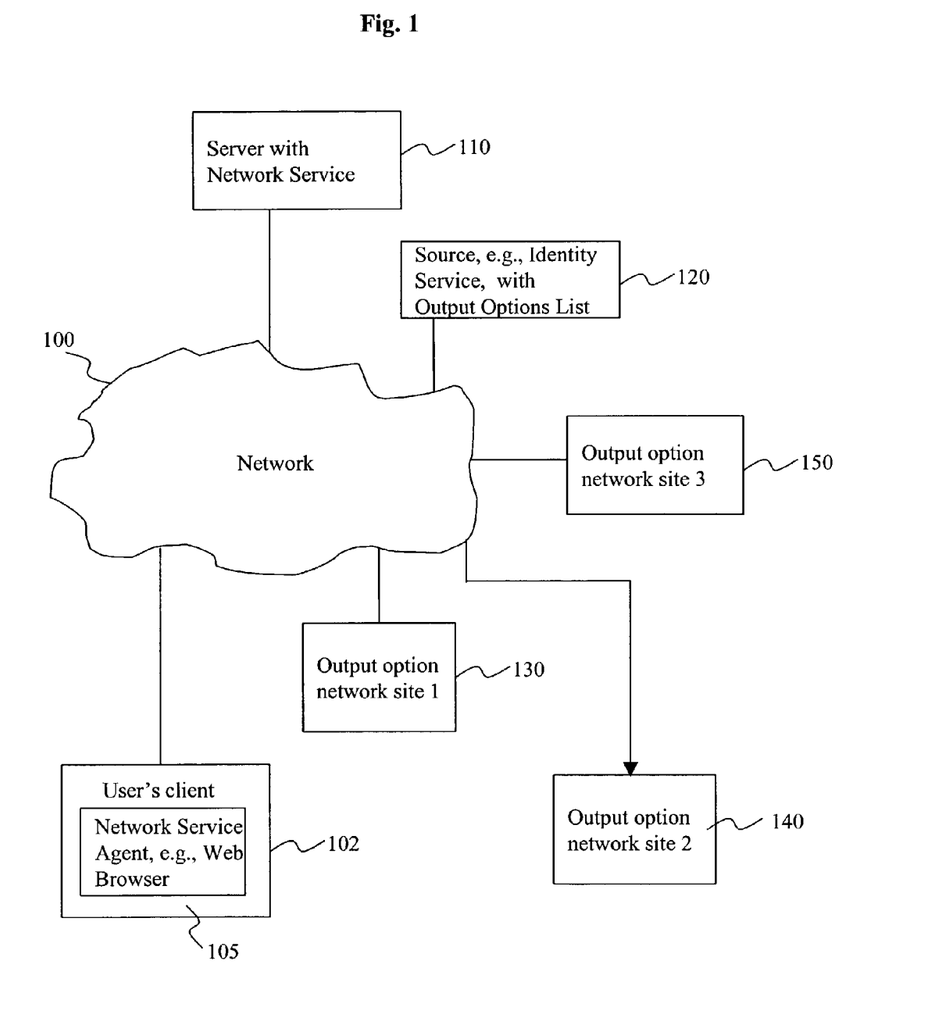
FIG. 1 is a block diagram of an overall system for implementing one embodiment of the present invention.

Referring to FIG. 1, there is shown an implementation of an embodiment of the present invention in the World Wide Web. The World Wide Web is designated as 100 in the figure. A user's computer and point of access to the system, referred to as a client, is designated as block 102. The client 102 includes a network service agent such as a web browser 105. Further included is a server 110, which in one embodiment may be a web server with one or a plurality of network services such as web applications. In an embodiment of the web server 110, the web server 110 may operate when accessed by the client browser 105, to download web content for a particular network service, e.g., such as a web application, to the client web browser 105.

Additionally, a list of user specific output options may be stored at a source 120 that is not part of the network service. By way of example, the source 120 may be an output options web identity service 120. However, more generally, an identity service represents any web based or other service capable of maintaining references to user access options in a manner to be retrievable from the network. Suitable means for accessing identity services include, for example, remote procedure call (RPC), common object request broker architecture (CORBA) and remote method invocation (RMI), which are well known remote procedure call protocols for initiating a call and transporting a call to another machine and transporting a response back to the calling machine. Accordingly, the source 120 may comprise in one embodiment a network identity service 120, such as a web identity service, with storage at one or more storage sites identified by one or more network references, such as URL's in a web implementation. As noted above, the identity service is not part of the network service, i.e., not part of the web application, and is designed to permit retrieval of identity or other information about a user by a browser or server.

The output options referenced by the source 120 may comprise, for example, output option 1 represented by block 130, output option 2 represented by block 140, and output option 3 represented by block 150. By way of example, these output options may comprise a "save to network storage" option, a "print" option, a "send via e-mail" option, a "post to the web" option, a "fax" option, a "network production services" (mimeo) option, a "novelty production services" option (e.g., a company that prints on mugs), a "document management system" option, an "online dictionary" option, or any other convenient or desirable option.

Figure 2:
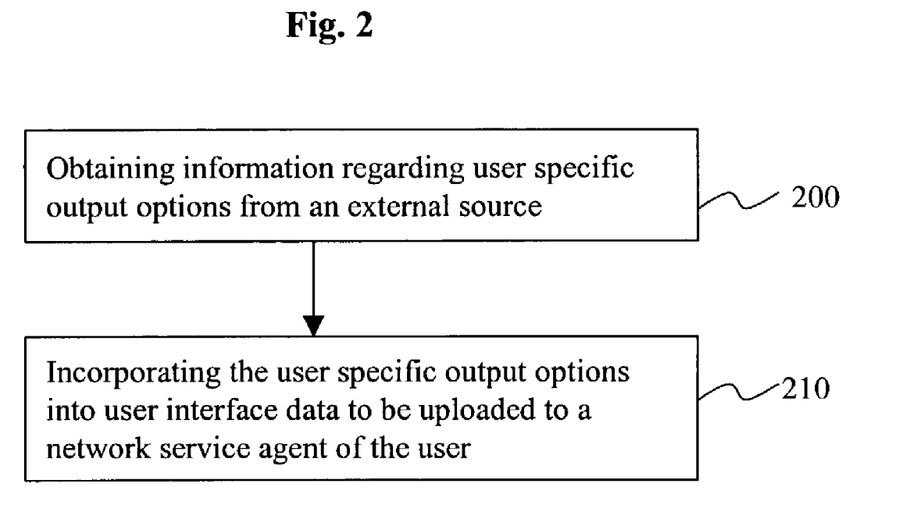
FIG. 2 is a flowchart of one embodiment of a server-side implementation of the present invention.

Referring to FIG. 2, there is shown a server-side embodiment of the present invention. The first step in the server-side embodiment is block 200 wherein information regarding user specific output options is obtained from a source that is not part of the network service, e.g., web application. The step of incorporating information such as a list of user specific output option references may be performed by server side technology such as ASP, servlet, ASP.NET, PHP, or CGI. In an embodiment of the present invention, the information may comprise a list of names and reference pairs for output options. Once obtained, in block 210 the user specific output options are incorporated into user interface data to be uploaded to a network service agent of a user in any manner desired by a code module responsible for generating the user interface data.

The user interface data referenced in the method of FIG. 2 may, by way of example, be in the form of at least one of the following: html, Javascript, Java applets, #svg, wml, xml and wscript. The user interface data may also comprise a hyperlink reference to a network service that provides an output option. The hyperlink reference is, for example, a return URL that redirects the user's network service agent back to the network service on the server 110.

The information regarding user specific output options may comprise, by way of example, at least one from the group of: a display string, a localized display string, a reference to a network service providing indicated output options, and access information, such as for example, passwords and authentication tokens.

A step may be provided of receiving an access key and an authentication token to access the identity service as the source 120. The receipt of this access key and authentication token may be via the network service agent 105, e.g., the browser.

In a yet further embodiment of the present invention, a step may be provided of receiving access to a currently active document, i.e., a document that was previously being operated upon by the network service, through an "active document" identity service that provides a reference and/or access information (an access key and an authentication token, for example) to the "active document". The communication with the "active document" identity service may be via the aforementioned protocols or other protocols. Thus, a method for determining an active document comprises, in one embodiment, accessing an active document identity service; retrieving a reference to a document being operated on by an application; and passing the reference to a web output option service.

In another embodiment of the present invention, a step may be provided of receiving state information for provision to the web content of the selected output option. By way of example, this state information may comprise one from the group of a current page, a selected word, and a zoom factor. This state information might also be provided by the identity service via the aforementioned protocols or other protocols.

In a yet further embodiment of the present invention, the source 120 for the user specific output options may comprise the manual provision of the options by a user.

In a yet further embodiment of the present invention, the source for the user specific output options may be obtained from a web browser cookie.

In a yet further embodiment of the present invention, the user specific output options to be displayed are accessed by a browser extension. A browser extension may be configured to respond to the execution of generic access instructions from web content by generating/mapping to corresponding client specific commands of the client. The extension may be implemented/thought of as an application programming interface (API). The API used for the extension is preferably in accordance with a system wide standard. The generic access instructions from the web content, when executed, may cause extension API calls to be issued to the API in order to effect client specific instructions.

Figure 3:
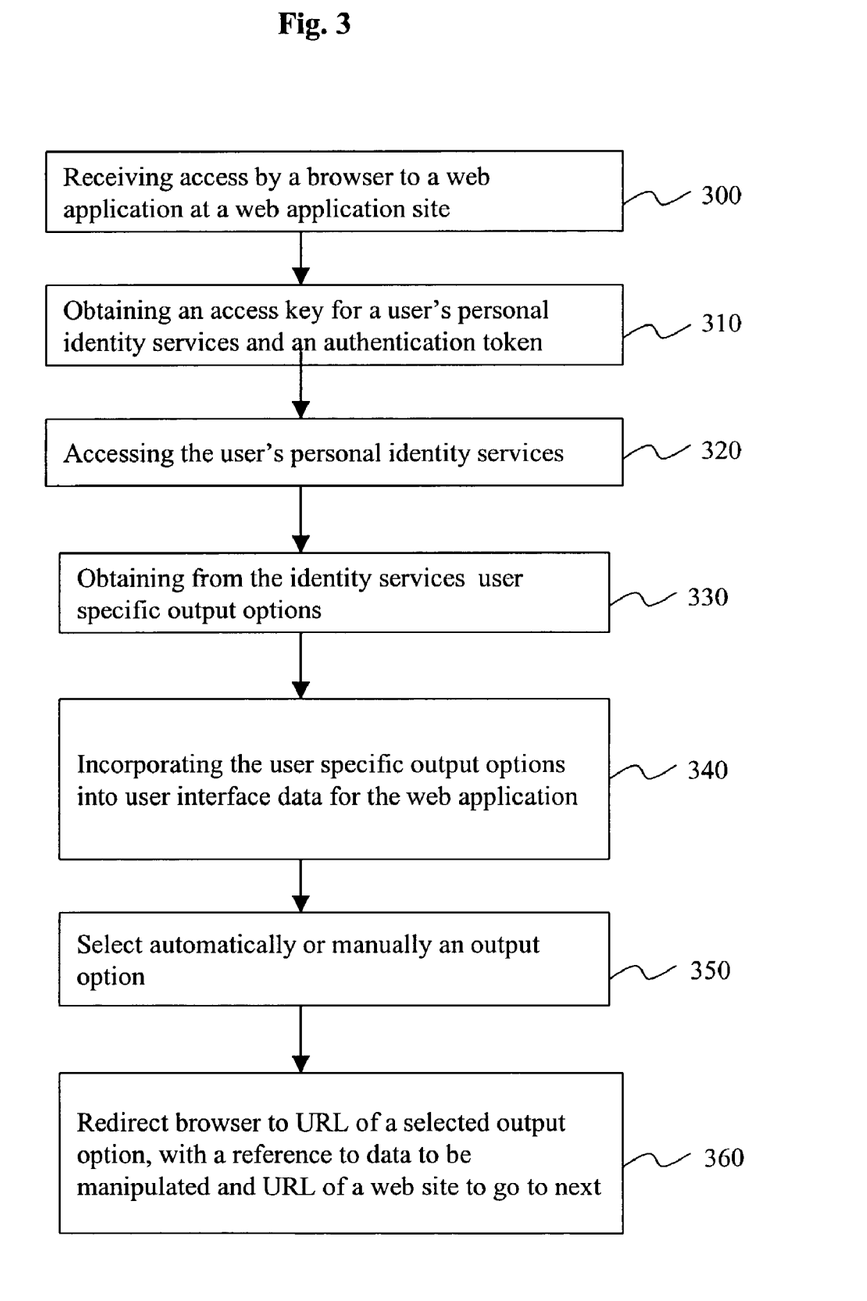
FIG. 3 is a flowchart of a web embodiment of the present invention.

Referring now to FIG. 3, which is an embodiment of the present invention in a web context, in a first step 300, a user browses to a web application (network service) site on a server. For example www.image-edit.hp.com. This web application is designed to participate in an ecosystem of identity services. Accordingly, the web application desires access to the user's identity service or services. Among other things, the web application desires a list of the user's specific output options. However, in one embodiment of the present invention, the web application does not yet know who the user is. Accordingly, in block 310 the web application redirects the user's browser to a central authentication site (CAS), e.g., www.authentication.hp.com. The web application encodes its own URL into the reference when redirecting the user's browser to the central authentication site. This encoding may, for example, be "www.authentication.hp.com? return URL=www.image-edit.hp.com". In one embodiment, the Central Authentication Site may use servlet technology to query the user's system for a current "authentication token". Such an authentication token may be obtained typically via a cookie residing on the user's system. If the CAS does not find an authentication token, then the CAS may generate a login page that is uploaded into the user's browser. The user may then log in and the CAS can authenticate the user and place a new authentication token on the user's system. The CAS then redirects the user's browser back to the original web application website and includes information about the location of the user's personal identity services along with a temporary "access key" and authentication token. By way of example, this redirection of the user's browser with this information to the original web application site may take the form of a URL such as "www.image-edit.hp.com?user=www.iohndoe.user's.hp.com&accessKey=1234567890.

Referring to block 320, the web application then accesses the user's personal identity services and uses the access key and authentication token to query the user's identity services for a list of user specific output options. (The identity service provided by the authentication service may either be an identity service providing references to other identity services or an actual "My Output Destinations" web service. If it is an identity service providing references to other identity services, than the additional step of requesting the "My Output Options" identity service may be required.) The step of actually obtaining these user specific output options is represented by block 330.

Referring to block 340, the user specific output options are incorporated into user interface data for web content to be served to the user's browser. By way of example, the user specific output options may be inserted into user interface data such as a template web page. In this regard, there may be specific areas in the web page to be filled in with the output options, using any one of ASP, PHP, ASP.NET, JSP, and CGI commands (or other server side scripting or content generation technologies known in the art or yet to be invented). In one embodiment of this incorporation step, each user specific output option may be wrapped in tags in a manner so that the user's browser may interpret and know where to place the user specific output option on the web page. The tags operate to tell the user's browser where and how to display the user output options on the web page. By way of example, each user specific output option may comprise a URL for redirecting the browser to a specific user output option. In one implementation of this embodiment, the text placed within tags may comprise a hot link to a specific user output option.

Alternatively, the incorporation step may be implemented using a web viewing language, such as svg, to generate code for incorporating the user specific output options. It should be noted that there are a variety of other techniques that are available or may become available in the future to accomplish this incorporation.

After the user specific output options have been incorporated into the web content and uploaded to the user's browser, then in block 350 the user may select automatically or manually an output option. In block 360 the user's browser is then redirected to the URL of the selected output option, along with a reference to data to be manipulated and a URL of a website to go to next or to return. (Alternatively, an identity service could be used to obtain a reference to the data, thus eliminating the need to include the reference in the URL.)

It should be noted that the identity of the user may be obtained in at least four different ways. In a first way, a cookie residing on the user's browser may be uploaded with an http request to the web application, with the cookie uniquely identifying the user. Alternatively, the user could manually identify itself either directly to the web application or via an identity service. In yet another alternative, the web application may initiate a request to an identity service at another machine to identify the user. The request or procedure call may use, for example, RPC, CORBA, RMI, DECOM, and SOAP. As a yet further alternative, an extension at the client side may obtain the necessary identification information for the user and provide that to the web application.

Figure 4:
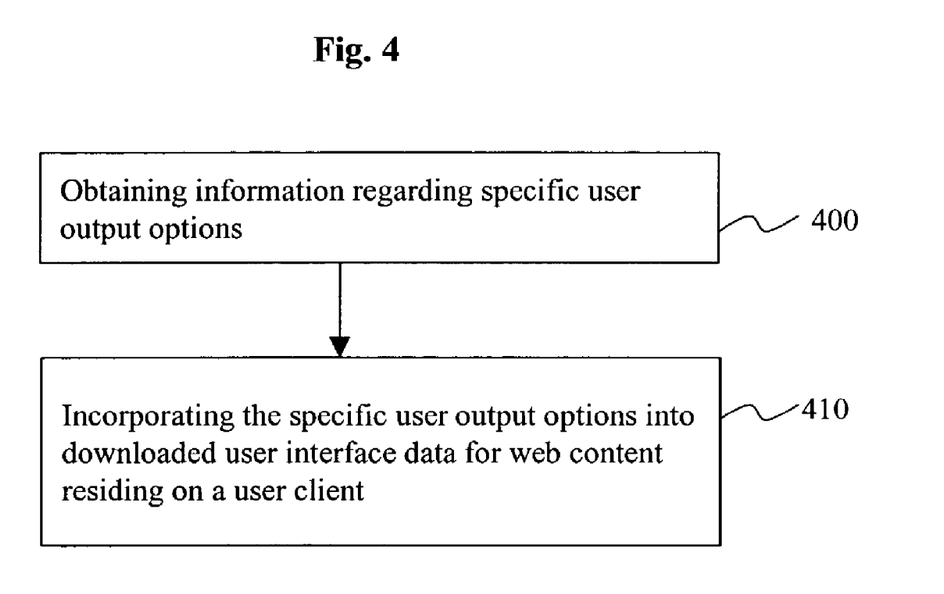
FIG. 4 is a flowchart of one embodiment of a client-side implementation of the present invention.

Referring now to FIG. 4, there is shown another embodiment of the present invention implemented primarily from the client side. Referring to block 400, a first step comprises obtaining information regarding user specific output options. In block 410 another step is then provided of incorporating the specific user output options into user interface data for web content residing on the user client.

In one embodiment of a client-side implementation of the present invention using a network service comprising a web application (http protocol or https protocol) and a network service agent comprising a web browser, a JAVA applet may be downloaded with web content from the web application and executed to identify the user and any necessary access key and authentication token, and followed by access to the user's identity services to obtain the user specific output options for incorporation. The applet may call an appropriate method to incorporate the user specific output options into the user interface data for the web content residing on the user's browser.

In another embodiment of the client side implementation of the present invention, an extension on the client may be called by a JAVA applet downloaded as part of the web contents. The extension would obtain the user identity by taking the necessary steps to access the user's identity services and obtain the user's specific output options.

It should be noted that the client-side implementation of the present invention may include most of the same options as the server-side implementation of the present invention. For example, the client-side implementation may, in one embodiment, receive a reference and/or access information for a currently active document that was previously being operated upon by the network service through an "active document" identity service.

Additionally, the user specific output options may comprise at least one of the "save to network storage" option, "print option", "send via e-mail" option, "post to the web" option, "fax" option, "network production services" option, "novelty production services" option, "document management system" option, or an "online dictionary" option.

In another embodiment of the client-side implementation of the invention, the information from the source may be provided manually by the user.

In another embodiment of the client-side implementation of the present invention, the source may be obtained from a web browser cookie.

In another embodiment of the client-side implementation of the present invention, the user interface data may comprise at least one of the following: html, Javascript, Java applets, C#, svg, wml, xml and wscript.

In another embodiment of the client-side implementation of the present invention, the information regarding user specific output options may comprise at least one from the group of: a display string, localized display strings, a reference to a network service providing indicated output options, and access information.

In another embodiment of the client-side implementation of the present invention, the user interface data may comprise a hyperlink reference to an output option providing network service.

In another embodiment of the client-side implementation of the present invention, the hyperlink reference may comprise a return URL which is used subsequently to redirect the user's network service agent back to the network service.

In another embodiment of the client-side implementation of the present invention, an access key and an authentication token may be obtained to access an identity service as the source.

In another embodiment of the client-side implementation of the present invention, the user specific output options may comprise a set of name and reference pairs.

In another embodiment of the client-side implementation of the present invention, the step may be provided of incorporating state information into the user interface data for provision to the selected user specific output option.

In another embodiment of the client-side implementation of the present invention, the user specific output options are accessed by a browser extension.

In another embodiment of the client-side implementation of the present invention, the incorporating the user specific output options step is performed by a servlet.

In another implementation for accessing the "active documents", this access may be accomplished by obtaining the "active document" from the user's personal imaging depository. In this regard, see "WEB BASED IMAGING SERVICE THAT CACHES PRE-PROCESSED CONTENT TO PROVIDE BETTER PERFORMANCE" by Shell Simpson, Ward Foster, and Kris Livingston, Ser. No. 09/924,060 filed on Aug. 8, 2001, which is hereby incorporated by reference in its entirety.

Accordingly, the present invention provides a method, program product, and system by which web applications may integrate specific user output options into an application. In one embodiment of the present invention, this may be accomplished through an identity service that allows users to specify preferred output options. The output options may be a list of name/value pairs where the name is the friendly name of the output option and the value is a URL to an output device or web page.

In a web embodiment of the present invention, when a user selects a particular output option, the browser is redirected to the specified URL for the output option and passes a reference to an "active document" being viewed/edited as well as the URL of the web application to be returned to after the output operation is completed. In another embodiment of the present invention, state information associated with the web application may be encoded into the return URL. Thus, the web application is able to provide complex output operation by simply redirecting the user's browser. Accordingly, the user is presented with the same rich output operations from one web application to the next without having to customize each different web application. As the user modifies his output options, these modifications are immediately reflected in the web applications he uses.

In another embodiment of the present invention, a web application may make a document an "active document" using an identity service that provides this capability, and then merely redirect the user's browser to the selected output destination. Thus, the desired document is not indicated in the redirection URL. Instead, the destination output option website accesses the "active document" through the identity service, thereby gaining access to the document in question. An advantage to this approach is to provide greater security. Rather than simply passing the "active document" URL to the destination output option website and having the destination output options website directly access the document (with no intervening steps), the destination website must first obtain permission from the user in a conventional fashion.

In another embodiment of the present invention, a credential necessary to access the "active document" may be passed along with an "active document" URL to the destination output option website. In this example, the web application and the destination output option website, such as a printer for example, may use a secure communication channel such as HTTPS or SSL. This approach provides greater security and also streamlines web application access to the "active document" object. Note that these various features of the different embodiments may coexist.

Accordingly, the present invention allows a user to specify his desired output options independent of the application he uses. A web application may incorporate the user's desired specific output options into the web application without previous knowledge of the user or any details about the output options.

The present invention allows web applications to not only be free from having to provide support for complex output options, but also allows web applications to provide the user with a user specific experience. For example, the notion of "save" and "print" may take on a variety of meanings, depending on the user. For example, "save" for one user might mean to store a copy of the document in that user's private storage, while for a different user the "save" option might mean to store a copy of the document in that user's private storage. Each of the private storages would be different: different vendors, and different underlying technologies, for example. Thus, documents may be stored and/or printed, for example, in a manner dictated by a user's' desires and needs.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen in generally on designer choice. It is understood that all such variations are within the scope of the invention. Likewise, software and web implementation of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for integrating user specific output options into a web application, the method comprising:
   storing the user specific output options at a web service distinct from the web application, the user specific output options specified by a user and providing a common set of user specific output options available to each of a plurality of web applications, including the web application, and comprising distribution operations for web content of each of the plurality of web applications, including the web application;
   browsing to the web application from a web browser of the user;
   after browsing to the web application, the web application obtaining access and authentication information for the user specific output options from the user;
   after obtaining the access and authentication information, the web application obtaining the user specific output options from the web service; and
   after obtaining the user specific output options from the web service, the web application incorporating the user specific output options into user interface data served with the web content of the web application to the web browser of the user.

2. The method as defined in claim 1, wherein the web service comprises an output options identity service.

3. The method as defined in claim 1, further comprising receiving at least one of a reference and access information for a currently active document that was previously being operated upon by the web application through an active document identity service.

4. The method as defined in claim 1, wherein the user specific output options comprise at least one of: save to network storage, print, send via email, post to the web, fax, network production services, novelty production services, document management system, or an online dictionary.

5. The method as defined in claim 1, wherein the user specific output options comprise a reference to a network service providing indicated output options and one or more from the group of: a display string, localized display strings, and access information.

6. The method as defined in claim 1, wherein the user interface data comprises a hyperlink reference to an output option providing network service.

7. The method of claim 6, wherein the hyperlink reference comprises a return URL which is used subsequently to redirect the web browser of the user back to the network service.

8. The method as defined in claim 1, wherein the user specific output options comprise a set of name and reference pairs.

9. The method as defined in claim 1, further comprising incorporating state information into the user interface data for provision to a selected output option.

10. A system for integrating user specific output options into a web application, the system comprising:
   a processor;
   a web service distinct from the web application for storing the user specific output options as specified by a user, the user specific output options providing a common set of user specific output options available to each of a plurality of web applications, including the web application, and comprising distribution operations for web content of each of the plurality of web applications, including the web application;

a web browser of the user for accessing the web application; and access and authentication information as provided by the user for the user specific output options, the web application obtaining the user specific output options from the web service using the access and authentication information, and incorporating the user specific output options into user interface data served with the web content of the web application to the web browser of the user.

11. The system of claim 10, wherein the user specific output options comprise at least one of: save to network storage, print, send via email, post to the web, fax, network production services, novelty production services, document management system, or an online dictionary.

* * * * *

UNITED STATES PATENT AND TRADEMARK OFFICE
CERTIFICATE OF CORRECTION

| | | |
|---|---|---|
| PATENT NO. | : 7,904,600 B2 | Page 1 of 1 |
| APPLICATION NO. | : 10/283240 | |
| DATED | : March 8, 2011 | |
| INVENTOR(S) | : Robert John Madril, Jr. et al. | |

It is certified that error appears in the above-identified patent and that said Letters Patent is hereby corrected as shown below:

On the face page, in field (73), Assignee, in column 1, line 1,
delete "Hewlott-Packard" and insert -- Hewlett-Packard --, therefor.

Signed and Sealed this
Seventh Day of June, 2011

David J. Kappos
*Director of the United States Patent and Trademark Office*